US008166748B2

(12) United States Patent
Schilling

(10) Patent No.: US 8,166,748 B2
(45) Date of Patent: May 1, 2012

(54) GAS TURBINE ENGINE BOOSTER HAVING ROTATABLE RADIALLY INWARDLY EXTENDING BLADES AND NON-ROTATABLE VANES

(75) Inventor: Jan Christopher Schilling, Middletown, OH (US)

(73) Assignee: General Electric Company, Schenectady, NY (US)

( * ) Notice: Subject to any disclaimer, the term of this patent is extended or adjusted under 35 U.S.C. 154(b) by 812 days.

(21) Appl. No.: 12/275,813

(22) Filed: Nov. 21, 2008

(65) Prior Publication Data

US 2010/0126141 A1 May 27, 2010

(51) Int. Cl.
*F02K 3/00* (2006.01)

(52) U.S. Cl. ........................................................ 60/268

(58) Field of Classification Search ............... 60/39.162, 60/226.1, 268; 415/77–79, 91
See application file for complete search history.

(56) References Cited

U.S. PATENT DOCUMENTS

| | | | | |
|---|---|---|---|---|
| 3,620,020 | A | 11/1971 | Halliwell et al. | |
| 3,673,802 | A * | 7/1972 | Krebs et al. | 60/226.1 |
| 4,976,102 | A | 12/1990 | Taylor | |
| 5,261,227 | A * | 11/1993 | Giffin, III | 60/226.1 |
| 6,145,300 | A | 11/2000 | Romani | |
| 6,619,030 | B1 | 9/2003 | Seda et al. | |
| 6,666,017 | B2 | 12/2003 | Prentice et al. | |
| 6,732,502 | B2 | 5/2004 | Seda et al. | |
| 6,739,120 | B2 | 5/2004 | Moniz et al. | |
| 6,763,652 | B2 | 7/2004 | Baughman et al. | |
| 6,763,654 | B2 | 7/2004 | Orlando et al. | |
| 6,883,303 | B1 | 4/2005 | Seda | |
| 2003/0163983 | A1 | 9/2003 | Seda et al. | |
| 2003/0200741 | A1 | 10/2003 | Moniz et al. | |
| 2004/0055276 | A1 | 3/2004 | Lewis et al. | |
| 2008/0098718 | A1 * | 5/2008 | Henry et al. | 60/226.1 |
| 2008/0120839 | A1 | 5/2008 | Schilling | |

FOREIGN PATENT DOCUMENTS

| | | | |
|---|---|---|---|
| DE | 102006023246 | A1 | 11/2007 |
| EP | 1340903 | A2 | 9/2003 |
| EP | 1653064 | A2 | 5/2006 |
| EP | 1878872 | A2 | 1/2008 |
| EP | 1921290 | A2 | 5/2008 |

OTHER PUBLICATIONS

PCT International Search Report and Written Opinion issued in connection with corresponding International Application No. PCT/US2009/061006 on Feb. 21, 2011.

* cited by examiner

*Primary Examiner* — Louis Casaregola
*Assistant Examiner* — Phutthiwat Wongwian
(74) *Attorney, Agent, or Firm* — William Scott Andes; Steven J. Rosen

(57) ABSTRACT

A gas turbine engine booster includes one or more rotatable booster stages having booster blades extending radially inwardly from a rotatable drum and one or more non-rotatable vane stages having booster vanes extending radially outwardly from a non-rotatable shell. The booster stages may be interdigitated with the vane stages. The booster may be co-rotatable or counter-rotatable with respect to a fan stage of an aircraft gas turbine engine. The booster may be driven by a single turbine or one of counter-rotatable turbines or though a gearbox by these turbines. The booster blades and the booster vanes extend across a core engine inlet duct having an entrance downstream of the first fan stage. A fan section with the booster may have counter-rotatable first and second fan stages with fan blades of the second fan stages connected to and mounted radially outwardly of the rotatable drum.

19 Claims, 6 Drawing Sheets

GAS TURBINE ENGINE BOOSTER HAVING ROTATABLE RADIALLY INWARDLY EXTENDING BLADES AND NON-ROTATABLE VANES

BACKGROUND OF THE INVENTION

1. Field of the Invention

The invention relates to aircraft gas turbine engines with single stage fans or counter-rotatable fan stages and, particularly, for such engines having boosters or boosters between the counter-rotatable fan stages.

2. Description of Related Art

A gas turbine engine of the turbofan type generally includes a forward fan and booster compressor, a middle core engine, and an aft low pressure power turbine. The core engine includes a high pressure compressor, a combustor, and a high pressure turbine in a serial flow relationship. The high pressure compressor and high pressure turbine of the core engine are interconnected by a high pressure shaft. The high pressure compressor, turbine, and shaft essentially form the high pressure rotor. The high pressure compressor is rotatably driven to compress air entering the core engine to a relatively high pressure. This high pressure air is then mixed with fuel in the combustor and ignited to form a high energy gas stream. The gas stream flows aft and passes through the high pressure turbine, rotatably driving it and the high pressure shaft which, in turn, rotatably drives the compressor.

The gas stream leaving the high pressure turbine is expanded through a second or low pressure turbine. The low pressure turbine rotatably drives the fan and booster compressor via a low pressure shaft, all of which form the low pressure rotor. The low pressure shaft extends through the high pressure rotor. Some fan jet engines have been designed with counter-rotatable turbines that power counter-rotatable fans and boosters or low pressure compressors. U.S. Pat. Nos. 4,790,133, 4,860,537, 5,307,622 and 6,732,502 disclose counter-rotatable low pressure turbines (LPT) that power counter-rotatable fans and booster or low pressure compressors. Most of the thrust produced is generated by the fan. There are also various designs for counter-rotatable fan engines that use gearboxes to effect counter-rotation of the fans and boosters.

Boosters typically have rotatable booster blades extending radially outwardly from a radially inner rotatable drum or rotor. The rotatable blades are interdigitated with non-rotatable booster vanes extend radially inwardly from a non-rotatable outer shell, drum, or duct. Among the drawbacks of this design is that the rotatable booster blades are more susceptible to rubs during engine accelerations. Thus, an alternative more robust engine design or configuration is desirable in order to minimize these rubs.

SUMMARY OF THE INVENTION

A gas turbine engine booster includes one or more rotatable booster stages having booster blades extending radially inwardly from a rotatable drum and one or more non-rotatable vane stages having booster vanes extending radially outwardly from a non-rotatable annular structure. An exemplary embodiment of the booster includes one or more booster blade rows of the booster blades of the one or more rotatable booster stages respectively, one or more vane rows of the booster vanes of the one or more non-rotatable vane stages respectively, and the booster blade rows are interdigitated with the vane rows.

The booster may be incorporated in an aircraft gas turbine engine fan section having a first fan stage with a first fan blade row of fan blades. The fan section may include a core engine inlet duct having an entrance downstream of the first fan stage and the booster blades and the booster vanes extending across the core engine inlet duct.

The fan stage may be a first fan stage counter-rotatable with respect to a second fan stage. The counter-rotatable first and second fan stages may include first and second fan blade rows respectively and the gas turbine engine booster may be axially located substantially between the first and second fan stages. The entrance to the core engine inlet duct may be located upstream of the second fan stage. Fan blades of the second fan blade row may be connected to and mounted radially outwardly of the rotatable drum.

The booster and fan section may be incorporated in an aircraft gas turbine engine having a core engine downstream of the fan section and a high pressure rotor with a high pressure turbine in the core engine. A low pressure turbine is downstream of the core engine and the gas turbine engine booster is axially located downstream of the fan stage.

BRIEF DESCRIPTION OF THE DRAWINGS

The foregoing aspects and other features of the invention are explained in the following description, taken in connection with the accompanying drawings where.

DETAILED DESCRIPTION OF THE INVENTION

Figure 1:
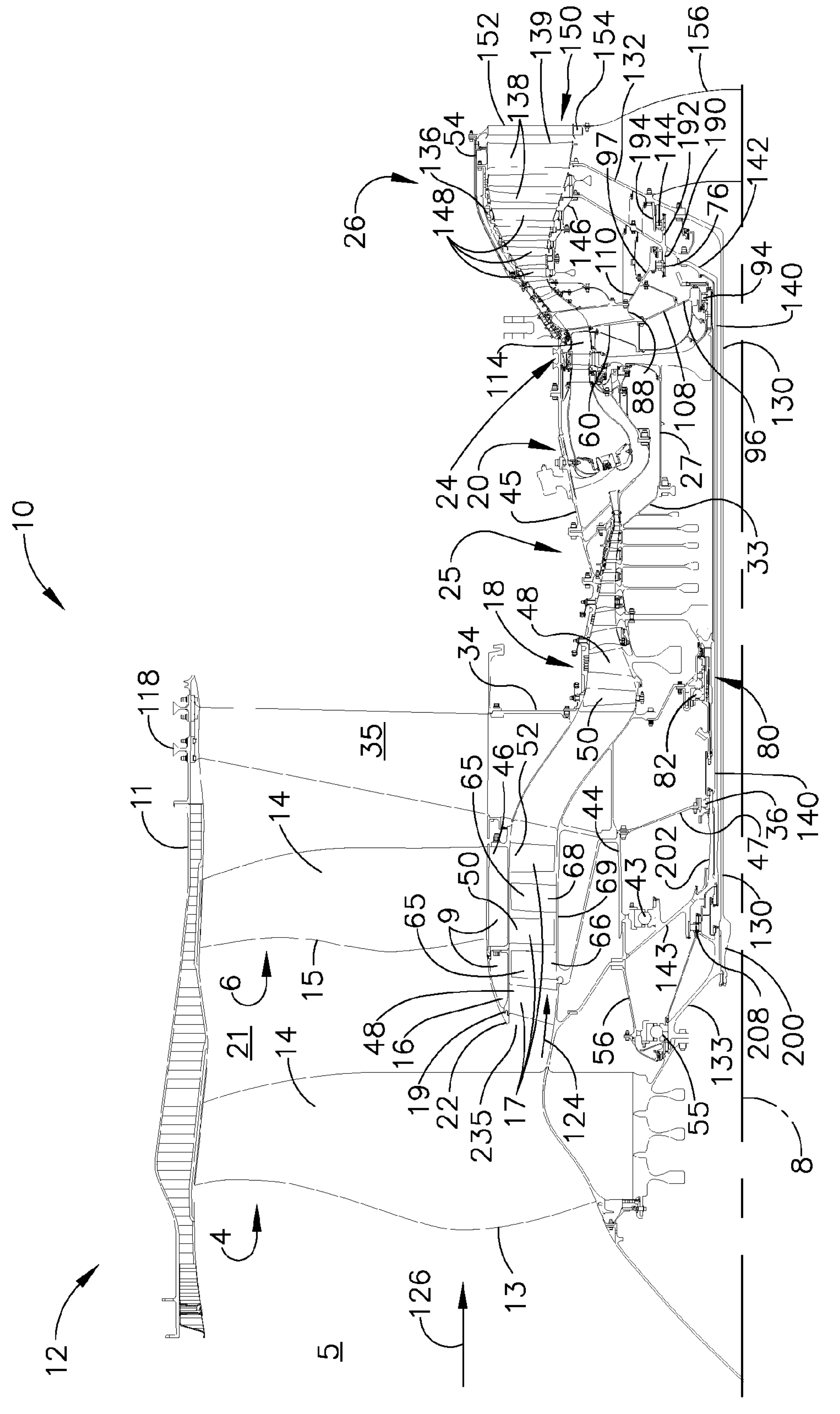
FIG. 1 is a longitudinal sectional view illustration of an exemplary embodiment of an aircraft turbofan gas turbine engine with counter-rotatable first and second fan stages and only a single set of co-rotatable booster blades extending radially inwardly from a rotatable drum.
Figure 2:
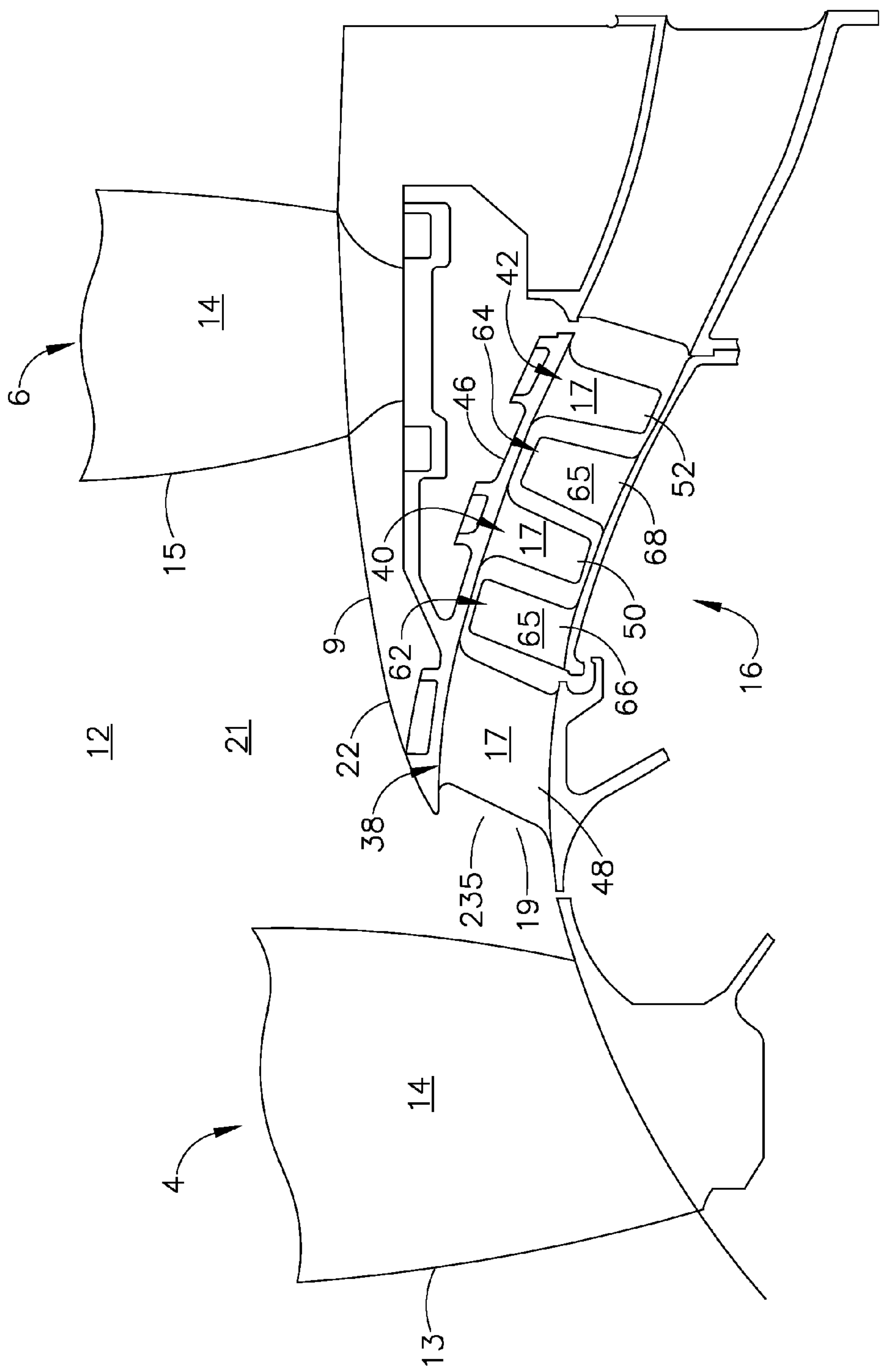
FIG. 2 is an enlarged longitudinal sectional view illustration of the fans and booster illustrated in FIG. 1.

Illustrated in FIGS. 1 and 2 is an exemplary turbofan gas turbine engine 10 circumscribed about an engine centerline 8 and having a fan section 12 which receives inlet airflow of ambient air 5. The fan section 12 has counter-rotatable first and second fan stages 4, 6 including first and second fan blade rows 13, 15, respectively. A booster 16 is axially located substantially between the first and second fan stages 4, 6. Locating the booster 16 substantially between the first and second fan stages 4, 6 helps to reduce noise due to aerodynamic interaction between the two fan stages.

The booster 16 has rotatable first, second, and third booster stages 38, 40, 42 with first, second, and third booster blade rows 48, 50, 52, respectively. Booster blades 17 of the first, second, and third booster blade rows 48, 50, 52 extend radially inwardly from a rotatable drum 46 connected to the second fan stage 6. The booster 16 has non-rotatable first and second vane stages 62, 64 with first and second vane rows 66, 68, respectively. Booster vanes 65 of the first and second vane stages 62, 64 extend radially outwardly from a non-rotatable shell 69 or other annular structure fixedly connected to a forward or fan frame 34. The first, second, and third booster blade rows 48, 50, 52 are interdigitated with the first and second vane rows 66, 68. Thus, when the engine accelerates the booster blades 17 are urged radially outwardly while the non-rotatable shell 69 remains radially in place, thus, reducing or eliminating rubs of the blades against the shells. This, in turn, allows a robust and lightweight design of the booster 16. Fan blades 14 of the second fan blade row 15 of the second fan stage 6 are mounted radially outwardly of the booster 16 and is connected to the rotatable drum 46.

Referring to FIG. 1, following the fan section 12 is a high pressure compressor (HPC) 18, a combustor 20 which mixes fuel with the air 5 pressurized by the HPC 18 for generating combustion gases which flow downstream through a high pressure turbine (HPT) 24, and a counter-rotatable low pressure turbine (LPT) 26 from which the combustion gases are discharged from the engine 10. A high pressure shaft 27 joins the HPT 24 to the HPC 18 to substantially form a first or high pressure rotor 33. The high pressure compressor 18, combustor 20, and high pressure turbine 24 collectively are referred to as a core engine 25 which includes, for the purposes of this patent, the high pressure shaft 27.

A bypass duct 21 radially, bounded by a fan casing 11 and a rotatable annular radially inner bypass duct wall 9, surrounds the booster 16 and a core engine inlet duct 19 to the high pressure compressor 18 of the core engine 25. The bypass duct 21 is radially bounded by a fan casing 11 and an annular radially inner bypass duct wall 9. The radially inner bypass duct wall 9 includes a rotatable wall section 22, including the rotatable drum 46, fixedly mounted to the second fan blade row 15. The second fan blade row 15 is radially disposed within the bypass duct 21 and the fan blades 14 extend radially outwardly from the rotatable wall section 22 and are located radially outwardly of the rotatable drum 46.

The inlet duct 19 has an entrance 235 located axially aft and downstream of the first fan stage 4 and the first fan blade row 13 which permits debris from the runway (FOD), dirt, particles, and ice to be centrifuged away out of a core portion 124 of fan air flow 126 exiting the first fan stage 4 and entering the inlet duct 19 and into the high pressure compressor 18 and the core engine 25. The booster blades 17 and vanes 65 are disposed across the inlet duct 19.

The counter-rotatable low pressure turbine 26 includes an annular outer drum rotor 136 rotatably mounted to a low pressure inner shaft 130 by an aft low pressure inner conical shaft extension 132. The outer drum rotor 136 includes a plurality of first low pressure turbine blade rows 138 extending radially inwardly therefrom and axially spaced from each other. The drum rotor 136 is cantilevered off of a final stage 139 of the first low pressure turbine blade rows 138 which is bolted to the aft low pressure inner conical shaft extension 132. The counter-rotatable low pressure turbine 26 also includes an annular low pressure inner drum rotor 146 rotatably mounted to a low pressure outer shaft 140 by an aft low pressure outer conical shaft extension 142. The inner drum rotor 146 includes a plurality of second low pressure turbine blade rows 148 extending radially outwardly therefrom and axially spaced from each other. The first low pressure turbine blade rows 138 are interdigitated with the second low pressure turbine blade rows 148.

The low pressure outer shaft 140 drivingly connects the inner drum rotor 146 to the booster 16 to which the second fan blade row 15 is connected. The booster 16 and the second fan blade row 15 are connected to the low pressure outer shaft 140 by a forward conical outer shaft extension 143. The low pressure outer shaft 140, the inner drum rotor 146, the second fan blade row 15, and the booster 16 are major components of a low pressure outer rotor 202. The low pressure inner shaft 130 drivingly connects the outer drum rotor 136 to the first fan blade row 13. The first fan blade row 13 is connected to the low pressure inner shaft 130 by a forward conical inner shaft extension 133. The low pressure inner shaft 130, the outer drum rotor 136, and the first fan blade row 13 are major components of a low pressure inner rotor 200. The low pressure inner and outer shafts 130, 140, respectively, are at least, in part, rotatably disposed co-axially with and radially inwardly of the high pressure rotor 33.

The low pressure outer rotor 202, by way of the forward conical outer shaft extension 143, is rotatably supported axially and radially from the fan frame 34 by an aft thrust bearing 43 mounted in a first bearing support structure 44 and a second bearing 36, a roller bearing, mounted in a second bearing support structure 47. The low pressure inner rotor 200, by way of the forward conical inner shaft extension 133, is rotatably supported axially and radially from the fan frame 34 by a forward differential thrust bearing 55 which is mounted between a forwardly extending extension 56 of the forward conical outer shaft extension 143 and the forward conical inner shaft extension 133. The low pressure inner rotor 200 is further rotatably supported radially from the fan frame 34 by a forward differential bearing 208, a roller bearing, between the low pressure inner shaft 130 and the low pressure outer shaft 140. The first and second bearing support structures 44, 47 are fixedly attached to the fan frame 34. The fan casing 11 is fixedly connected to the fan frame 34 by fan frame struts 35.

The low pressure outer rotor 202, by way of the aft low pressure outer conical shaft extension 142 connected to the low pressure outer shaft 140, is rotatably supported radially by a third bearing 76 within the inter-turbine frame 60. The third bearing 76 is disposed between an aft bearing support structure 97 attached to an aft portion 110 of the inter-turbine frame 60 and a forward inner extension 190 of the aft low pressure outer conical shaft extension 142. The low pressure outer rotor 202 is most aftwardly rotatably supported by the third bearing 76 which is, thus, referred to as an aftwardmost low pressure rotor support bearing. An inter-turbine frame 60 axially located between the HPT 24 and the LPT 26 substantially supports the entire low pressure turbine 26.

The low pressure inner rotor 200, by way of the aft low pressure inner conical shaft extension 132 connected to the low pressure inner shaft 130, is rotatably supported radially by the aft low pressure outer conical shaft extension 142 of the low pressure outer rotor 202. A differential bearing 144 (also referred to as an inter-shaft bearing) is disposed between an aft inner extension 192 of the aft low pressure outer conical shaft extension 142 and an outer extension 194 of the aft low pressure inner conical shaft extension 132. This allows the low pressure inner and outer rotors 200, 202 to counter-rotate.

A forward high pressure end 70 of the high pressure compressor 18 of the high pressure rotor 33 is radially rotatably supported by a bearing assembly 80 mounted in a bearing assembly support structure 82 attached to the fan frame 34. An aft end 92 of the high pressure rotor 33 is aftwardly radially rotatably supported by a fifth bearing 94 mounted in a forward bearing support structure 96 attached to a forward portion 108 of the inter-turbine frame 60. The forward and aft bearing support structures 96, 97 are fixedly joined or attached to the forward and aft portions 108, 110, respectively, of the inter-turbine frame 60 and are spaced axially apart. The forward and aft portions 108, 110, respectively, of the inter-turbine frame 60 are separated by the second structural ring 88.

Located aft of the LPT 26 is an outlet guide vane assembly 150 which supports a stationary row of outlet guide vanes 152 that extend radially inwardly between a low pressure turbine casing 54 and an annular box structure 154. The outlet guide vane assembly 150 deswirls gas flow exiting the LPT 26. The low pressure turbine casing 54 connected is bolted to the engine casing 45 at the end of the inter-turbine transition duct 114 between the HPT 24 and the LPT 26. A dome-shaped cover plate 156 is bolted to the annular box structure 154.

Many other types of counter-rotatable and non-counter-rotatable or gas turbine engines having single direction of rotation rotors or fans having boosters may use the booster configuration disclosed herein. Several such gas turbines are described below.

Figure 3:
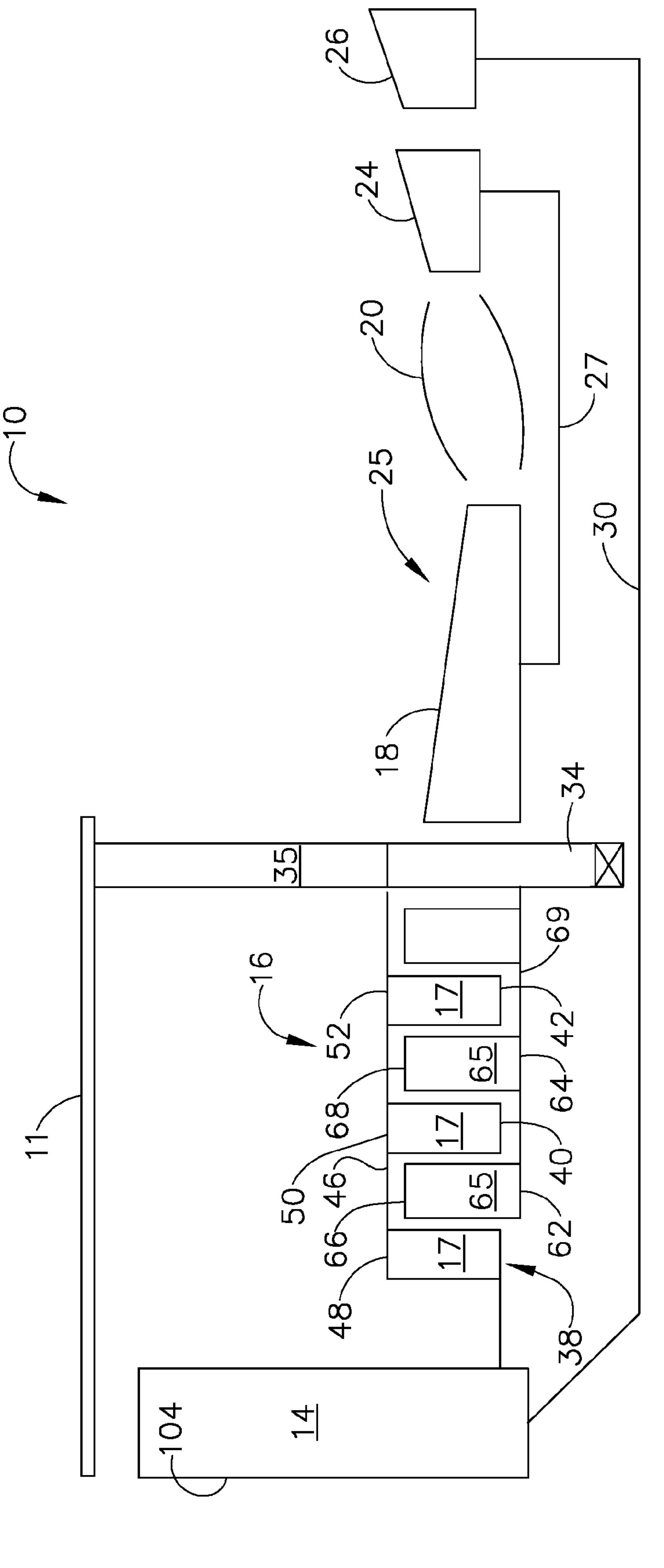
FIG. 3 is a longitudinal sectional view illustration of an exemplary embodiment of an aircraft turbofan gas turbine engine with a single fan stage and only a single set of co-rotatable booster blades extending radially inwardly from a rotatable drum connected to the fan stage.

Schematically illustrated in FIG. 3 is an exemplary embodiment of an aircraft turbofan gas turbine engine 10 with a single fan stage 104 of fan blades 14 and a booster 16 with only a single set of co-rotatable booster blades 17 extending radially inwardly from a rotatable drum 46 connected to the fan stage 104. The booster 16 has rotatable first, second, and third booster stages 38, 40, 42 with first, second, and third booster blade rows 48, 50, 52, respectively. Booster blades 17 of the first, second, and third booster blade rows 48, 50, 52 extend radially inwardly from the rotatable drum 46. The booster 16 has non-rotatable first and second vane stages 62, 64 with first and second vane rows 66, 68, respectively. Booster vanes 65 of the first and second vane stages 62, 64 extend radially outwardly from a non-rotatable shell 69 or other annular structure fixedly connected to a forward or fan frame 34. The first, second, and third booster blade rows 48, 50, 52 are interdigitated with the first and second vane rows 66, 68. Thus, when the engine accelerates the booster blades 17 are urged radially outwardly while the non-rotatable shell 69 remains radially in place, thus, reducing or eliminating rubs of the blades against the shells. This in turn allows a robust and lightweight design of the booster 16.

Figure 4:
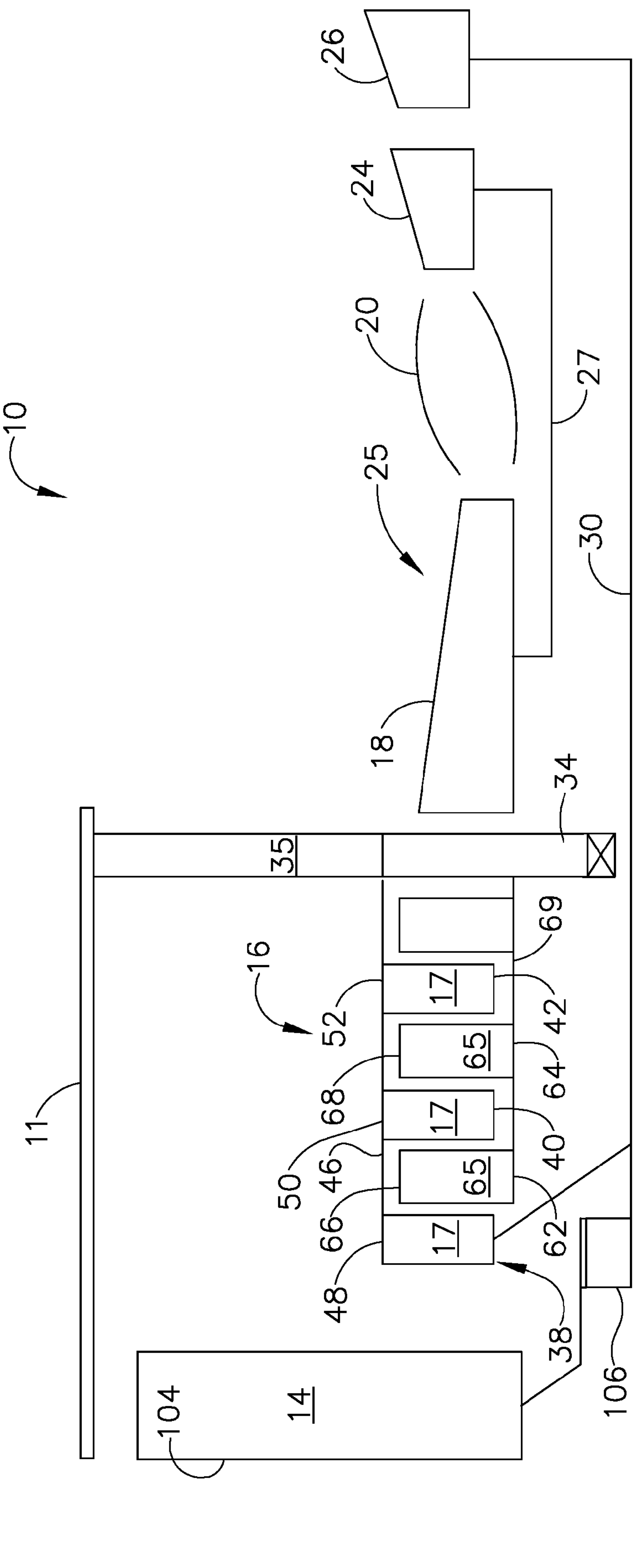
FIG. 4 is a longitudinal sectional view illustration of an exemplary embodiment of an aircraft turbofan gas turbine engine with a single fan stage drivenly connected to a turbine by a low pressure shaft and only a single set of co-rotatable booster blades extending radially inwardly from a rotatable drum connected to the gearbox and counter-rotatable with respect to the fan stage.

Schematically illustrated in FIG. 4 is an exemplary embodiment of an aircraft turbofan gas turbine engine 10 with a single fan stage 104. Downstream of the single fan stage 104 is a high pressure compressor 18, a combustor 20, a high pressure turbine (HPT) 24, and a low pressure turbine (LPT) 26 from which the combustion gases are discharged from the engine 10. A high pressure shaft 27 joins the HPT 24 to the HPC 18. The high pressure compressor 18, combustor 20, and high pressure turbine 24 collectively are referred to as a core engine 25 which includes, for the purposes of this patent. The single fan stage 104 is drivenly connected through a reduction gearbox 106 to a low pressure turbine 26 by a low pressure shaft 30.

A booster 16 with only a single set of co-rotatable booster blades 17 extending radially inwardly from a rotatable drum 46 is directly driven by the low pressure turbine 26 through the low pressure shaft 30. The booster blades 17 and the rotatable drum 46 are drivenly connected to the low pressure shaft 30 and is counter-rotatable with respect to the fan stage 104. The booster blades 17 and the rotatable drum 46 will also rotate at a greater speed than the fan stage 104. The booster 16 has rotatable first, second, and third booster stages 38, 40, 42 with first, second, and third booster blade rows 48, 50, 52, respectively. Booster blades 17 of the first, second, and third booster blade rows 48, 50, 52 extend radially inwardly from the rotatable drum 46. The booster 16 has non-rotatable first and second vane stages 62, 64 with first and second vane rows 66, 68, respectively. Booster vanes 65 of the first and second vane stages 62, 64 extend radially outwardly from a non-rotatable shell 69 or other annular structure fixedly connected to a forward or fan frame 34. The first, second, and third booster blade rows 48, 50, 52 are interdigitated with the first and second vane rows 66, 68. Thus, when the engine accelerates the booster blades 17 are urged radially outwardly while the non-rotatable shell 69 remains radially in place, thus, reducing or eliminating rubs of the blades against the shells. This, in turn, allows a robust and lightweight design of the booster 16.

Figure 5:
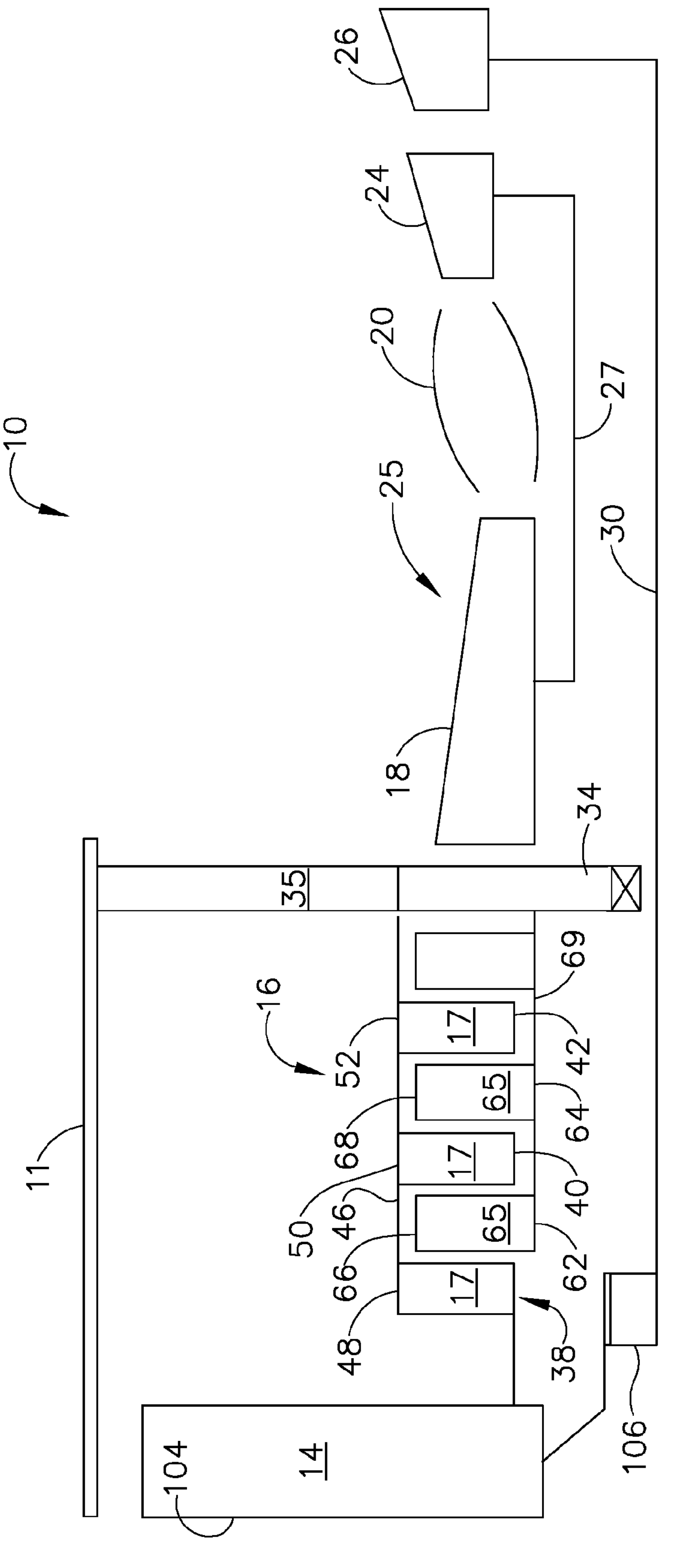
FIG. 5 is a longitudinal sectional view illustration of an exemplary embodiment of an aircraft turbofan gas turbine engine with a single fan stage drivenly connected through a gearbox to a turbine and only a single set of co-rotatable booster blades extending radially inwardly from a rotatable drum connected to the fan stage.

Schematically illustrated in FIG. 5 is an exemplary embodiment of an aircraft turbofan gas turbine engine 10 with a single fan stage 104 drivenly connected through a gearbox 106 to a low pressure turbine 26 and a booster 16 with only a single set of co-rotatable booster blades 17 extending radially inwardly from a rotatable drum 46 which is drivenly connected to the fan stage 104. The booster 16 has rotatable first, second, and third booster stages 38, 40, 42 with first, second, and third booster blade rows 48, 50, 52, respectively. Booster blades 17 of the first, second, and third booster blade rows 48, 50, 52 extend radially inwardly from the rotatable drum 46.

The booster 16 has non-rotatable first and second vane stages 62, 64 with first and second vane rows 66, 68, respectively. Booster vanes 65 of the first and second vane stages 62, 64 extend radially outwardly from a non-rotatable shell 69 or other annular structure fixedly connected to a forward or fan frame 34. The first, second, and third booster blade rows 48, 50, 52 are interdigitated with the first and second vane rows 66, 68. Thus, when the engine accelerates the booster blades 17 are urged radially outwardly while the non-rotatable shell 69 remains radially in place, thus, reducing or eliminating rubs of the blades against the shells. This, in turn, allows a robust and lightweight design of the booster 16.

Figure 6:
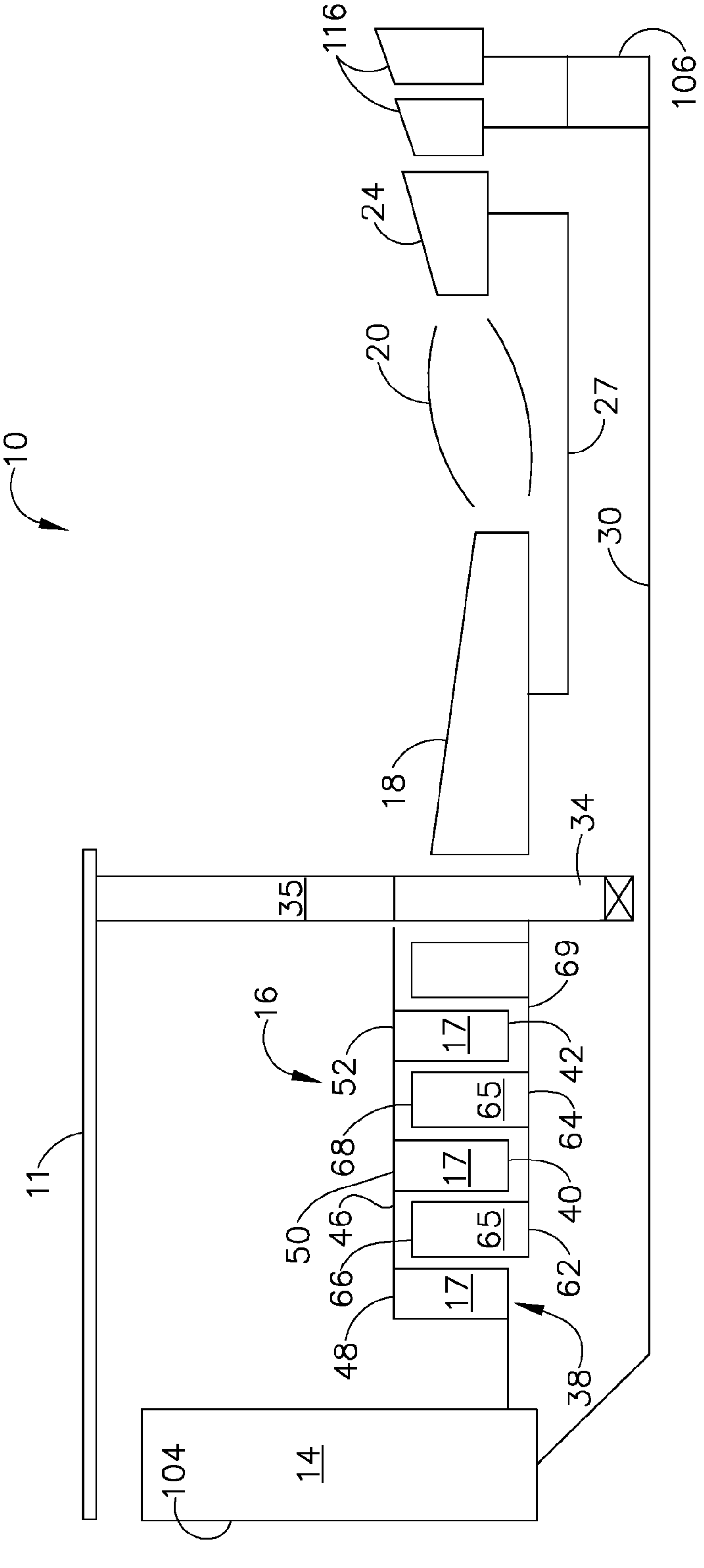
FIG. 6 is a longitudinal sectional view illustration of an exemplary embodiment of an aircraft turbofan gas turbine engine with a single fan stage drivenly connected through a gearbox to counter-rotatable turbines and only a single set of co-rotatable booster blades extending radially inwardly from a rotatable drum connected to the fan stage.

Schematically illustrated in FIG. 6 is an exemplary embodiment of an aircraft turbofan gas turbine engine 10 with a single fan stage 104 drivenly connected through a gearbox 106 to first and second counter-rotatable low pressure turbines 116, 118 and a booster 16 with only a single set of co-rotatable booster blades 17 extending radially inwardly from a rotatable drum 46 drivenly connected to the fan stage 104. The booster 16 has rotatable first, second, and third booster stages 38, 40, 42 with first, second, and third booster blade rows 48, 50, 52, respectively. Booster blades 17 of the first, second, and third booster blade rows 48, 50, 52 extend radially inwardly from the rotatable drum 46. The booster 16 has non-rotatable first and second vane stages 62, 64 with first and second vane rows 66, 68, respectively. Booster vanes 65 of the first and second vane stages 62, 64 extend radially outwardly from a non-rotatable shell 69 or other annular structure fixedly connected to a forward or fan frame 34. The first, second, and third booster blade rows 48, 50, 52 are interdigitated with the first and second vane rows 66, 68. Thus, when the engine accelerates the booster blades 17 are urged radially outwardly while the non-rotatable shell 69 remains radially in place, thus, reducing or eliminating rubs of the blades against the shells. This in turn allows a robust and lightweight design of the booster 16.

The present invention has been described in an illustrative manner. It is to be understood that the terminology which has been used is intended to be in the nature of words of description rather than of limitation. While there have been described herein, what are considered to be preferred and exemplary embodiments of the present invention, other modifications of the invention shall be apparent to those skilled in the art from the teachings herein and, it is, therefore, desired to be secured in the appended claims all such modifications as fall within the true spirit and scope of the invention.

Accordingly, what is desired to be secured by Letters Patent of the United States is the invention as defined and differentiated in the following claims:

What is claimed is:

1. A gas turbine engine booster comprising:

one or more rotatable booster blade rows of rotatable booster blades extending radially inwardly from a rotatable drum, one or more non-rotatable booster vane rows of non-rotatable booster vanes extending radially outwardly from a non-rotatable annular structure, and the booster blade rows being interdigitated with the booster vane rows.

2. An aircraft gas turbine engine fan section comprising:

a fan stage including a fan blade row, a gas turbine engine booster axially located downstream of the fan stage, the booster including one or more rotatable booster rows having rotatable booster blades extending radially inwardly from a rotatable drum, and the booster including one or more non-rotatable booster vane rows having non-rotatable booster vanes extending radially outwardly from a non-rotatable annular structure, and the booster blade rows being interdigitated with the booster vane rows.

3. An aircraft gas turbine engine fan section as claimed in claim 2, further comprising a core engine inlet duct having an entrance downstream of the fan stage and the booster blades and the booster vanes extending across the core engine inlet duct.

4. An aircraft gas turbine engine fan section as claimed in claim 2, further comprising:

comprising:

the fan stage being a counter-rotatable first fan stage counter-rotatable with respect to a counter-rotatable second fan stage, the counter-rotatable first and second fan stages including first and second fan blade rows respectively, and the gas turbine engine booster axially located substantially between the first and second fan stages.

5. An aircraft gas turbine engine fan section as claimed in claim 4, further comprising a core engine inlet duct having an entrance downstream of the first fan stage and the booster blades and the booster vanes extending across the core engine inlet duct.

6. An aircraft gas turbine engine fan section as claimed in claim 5, further comprising the entrance to the core engine inlet duct being upstream of the second fan stage.

7. An aircraft gas turbine engine fan section as claimed in claim 4, further comprising fan blades of the second fan blade row being connected to and mounted radially outwardly of the rotatable drum.

8. An aircraft gas turbine engine fan section as claimed in claim 7, further comprising a core engine inlet duct having an entrance downstream of the first fan stage and the booster blades and the booster vanes extending across the core engine inlet duct.

9. An aircraft gas turbine engine fan section as claimed in claim 8, further comprising the entrance to the core engine inlet duct being upstream of the second fan stage.

10. An aircraft gas turbine engine comprising:

an engine fan section including a fan stage having at least one fan blade row, a core engine downstream of the fan section and including a high pressure rotor with a high pressure turbine, a low pressure turbine downstream of the core engine, a gas turbine engine booster axially located downstream of the fan stage, the booster including one or more rotatable booster blade rows having rotatable booster blades extending radially inwardly from a rotatable drum, the booster including one or more non-rotatable vane rows having non-rotatable booster vanes extending radially outwardly from a non-rotatable annular structure, and the booster blade rows being interdigitated with the booster vane rows.

11. An aircraft gas turbine engine as claimed in claim 10, further comprising:

a core engine inlet duct to the core engine, the core engine inlet duct having an entrance downstream of the fan stage and the booster blades, and the booster vanes extending across the core engine inlet duct.

12. An aircraft gas turbine engine as claimed in claim 10, further comprising:

the fan stage being a counter-rotatable first fan stage counter-rotatable with respect to a counter-rotatable second fan stage, the counter-rotatable first and second fan stages including first and second fan blade rows respectively, and the gas turbine engine booster axially located substantially between the first and second fan stages.

13. An aircraft gas turbine engine as claimed in claim 12, further comprising a core engine inlet duct having an entrance downstream of the first fan stage and the booster blades and the booster vanes extending across the core engine inlet duct.

14. An aircraft gas turbine engine as claimed in claim 13, further comprising the entrance to the core engine inlet duct being upstream of the second fan stage.

15. An aircraft gas turbine engine as claimed in claim 12, further comprising fan blades of the second fan blade row being connected to and mounted radially outwardly of the rotatable drum.

16. An aircraft gas turbine engine as claimed in claim 15, further comprising a core engine inlet duct having an entrance downstream of the first fan stage and the booster blades and the booster vanes extending across the core engine inlet duct.

17. An aircraft gas turbine engine as claimed in claim 16, further comprising the entrance to the core engine inlet duct being upstream of the second fan stage.

18. An aircraft gas turbine engine comprising:

an engine fan section including a single fan stage having fan blades, a core engine downstream of the fan section and including a high pressure rotor with a high pressure turbine, a low pressure turbine downstream of the core engine, a gas turbine engine booster axially located downstream of the fan stage, the booster including one or more rotatable booster blade rows having rotatable booster blades extending radially inwardly from a rotatable drum, the booster including one or more non-rotatable vane rows having non-rotatable booster vanes extending radially outwardly from a non-rotatable annular structure, the booster blade rows being interdigitated with the booster vane rows, a reduction gearbox drivenly connected to the low pressure turbine by a low pressure shaft, the reduction gearbox drivenly connected to the fan stage, and the rotatable drum and the booster blades drivenly connected to the low pressure shaft.

19. An aircraft gas turbine engine as claimed in claim 18, further comprising:

a core engine inlet duct to the core engine, the core engine inlet duct having an entrance downstream of the single fan stage and the booster blades, and the booster vanes extending across the core engine inlet duct.

* * * * *